US 7,957,529 B2
Jun. 7, 2011

(54) PROCUREMENT AND AUDIT OF DIGITAL RIGHTS MANAGEMENT EVENT DATA

(75) Inventors: Glenn E. Brew, Boca Raton, FL (US); James C. Mahlbacher, Lake Worth, FL (US); Joseph C. Polimeni, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 11/781,535

(22) Filed: Jul. 23, 2007

(65) Prior Publication Data

US 2009/0031428 A1 Jan. 29, 2009

(51) Int. Cl.
*H04N 7/167* (2006.01)

(52) U.S. Cl. .............. 380/201; 726/27; 726/33; 726/28; 726/29; 726/30; 726/31; 726/32

(58) Field of Classification Search ................... 707/10, 707/101, 204
See application file for complete search history.

(56) References Cited

U.S. PATENT DOCUMENTS

| | | | | |
|---|---|---|---|---|
| 5,611,730 | A * | 3/1997 | Weiss | 463/20 |
| 6,477,251 | B1 * | 11/2002 | Szrek et al. | 380/46 |
| 6,931,550 | B2 * | 8/2005 | Rygaard | 726/23 |
| 6,993,131 | B1 * | 1/2006 | Meyers | 380/201 |
| 7,587,762 | B2 * | 9/2009 | Singhal et al. | 726/23 |
| 7,644,444 | B2 * | 1/2010 | Kamiya et al. | 726/29 |
| 2004/0199601 | A1 * | 10/2004 | Contarino | 709/217 |
| 2006/0190410 | A1 * | 8/2006 | Harper | 705/59 |
| 2007/0005505 | A1 * | 1/2007 | D'Alo et al. | 705/59 |

\* cited by examiner

*Primary Examiner* — Kambiz Zand
*Assistant Examiner* — Dant B Shaifer Harriman
(74) *Attorney, Agent, or Firm* — Thomas E. Lees, LLC

(57) ABSTRACT

A method to procure and audit digital rights management (DRM) event data by collecting a first set of event data in a first event data format, converting the first set of event data to one or more standardized event data formats, and communicating the first set of event data to an event data collection server for storage. The method may also include collecting a second set of event data in a second event data format, converting the second set of event data to one or more standardized event data formats, and communicating the second set of event data to the event data collection server for storage. The method may also include storing the first and second sets of event data in a centralized repository, authorizing access to the event data, and performing an event data audit corresponding to the event data.

8 Claims, 2 Drawing Sheets

PROCUREMENT AND AUDIT OF DIGITAL RIGHTS MANAGEMENT EVENT DATA

BACKGROUND OF THE INVENTION

1. Field of the Invention

This invention relates to event data auditing systems and methods and more particularly to systems and methods for procuring and auditing digital rights management event data.

2. Description of the Related Art

Among the objectives of digital rights management (DRM) technology is to enable digital asset owners to manage how and when others may use one or more of the owner's digital assets. DRM technology may take on various forms that include hardware and/or software necessary to collect event data. DRM technology may also include cryptography and other protective measures to protect one or more digital assets. Digital assets may include, but are not limited to, hardware components, software components, and content. To ensure others are using the digital assets appropriately, DRM technology may include the generation of event data that may be audited by the owner. Though DRM technology enables auditing, certain problems exist.

For example, where a digital asset owner implements a digital asset on multiple customer computing devices each computing device may include DRM technology that produces event data in a distinct format. When the digital asset owner desires to audit the event data to ensure the digital asset is being used within the bounds of a lease agreement or otherwise, the digital asset owner must audit the event data in multiple formats or spend time and resources to convert the event data to a different format that is more complementary to the computing device performing the audit. The situation is further frustrated as the number of distinct formats increases or if travel time is required due to geographically distributed and isolated systems.

SUMMARY OF THE INVENTION

The present invention has been developed in response to the present state of the art, and in particular, in response to the problems and needs in the art that have not yet been fully solved by currently available solutions. Accordingly, the present invention has been developed to provide a system and method for procuring and auditing digital rights management (DRM) event data that overcome many or all of the above-discussed shortcomings in the art.

A system of the present invention is presented to procure and audit DRM event data. The system may be embodied as a first host computer and a second host computer that each collect event data in a format particular to the first host computer and second host computer. The first and second host computers convert the event data to one or more standardized event data formats and communicate the event data to an event data collection server for storage in a centralized repository. The event data collection server may authorize an audit computer to access the event data and perform an event data audit thereof.

In certain embodiments, the system may include additional host computers capable of performing operations similar to those of the aforementioned first and second host computers. In certain embodiments, the first event data format and the second event data format each correspond to a first DRM technology operating on the first host computer and a second DRM technology operating on the second host computer. In some embodiments, the system includes multiple audit computers. In some embodiments, the one or more standardized event data formats corresponds to one or more of the multiple audit computers. In certain embodiments, the one or more of the audit computers initiate one or more queries against the centralized repository for event data of interest. In certain embodiments, the event data collection server and audit computer are combined into a single computing platform.

A method of the present invention is also presented for procuring and auditing DRM event data. The method in the disclosed embodiments substantially includes the steps necessary to carry out the functions presented above with respect to the operation of the described system. In one embodiment, the method includes collecting a first and second set of event data in a first and second event data format, respectively. In certain embodiments, the method also includes converting the first and second sets of data to a standardized event data format and communicating the first and second set of event data to an event data collection server for storage in a centralized repository. The method may also include authorizing one or more audit computers to access to the first and second set of event data and performing an event data audit thereof.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

One or more of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, systems or networks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
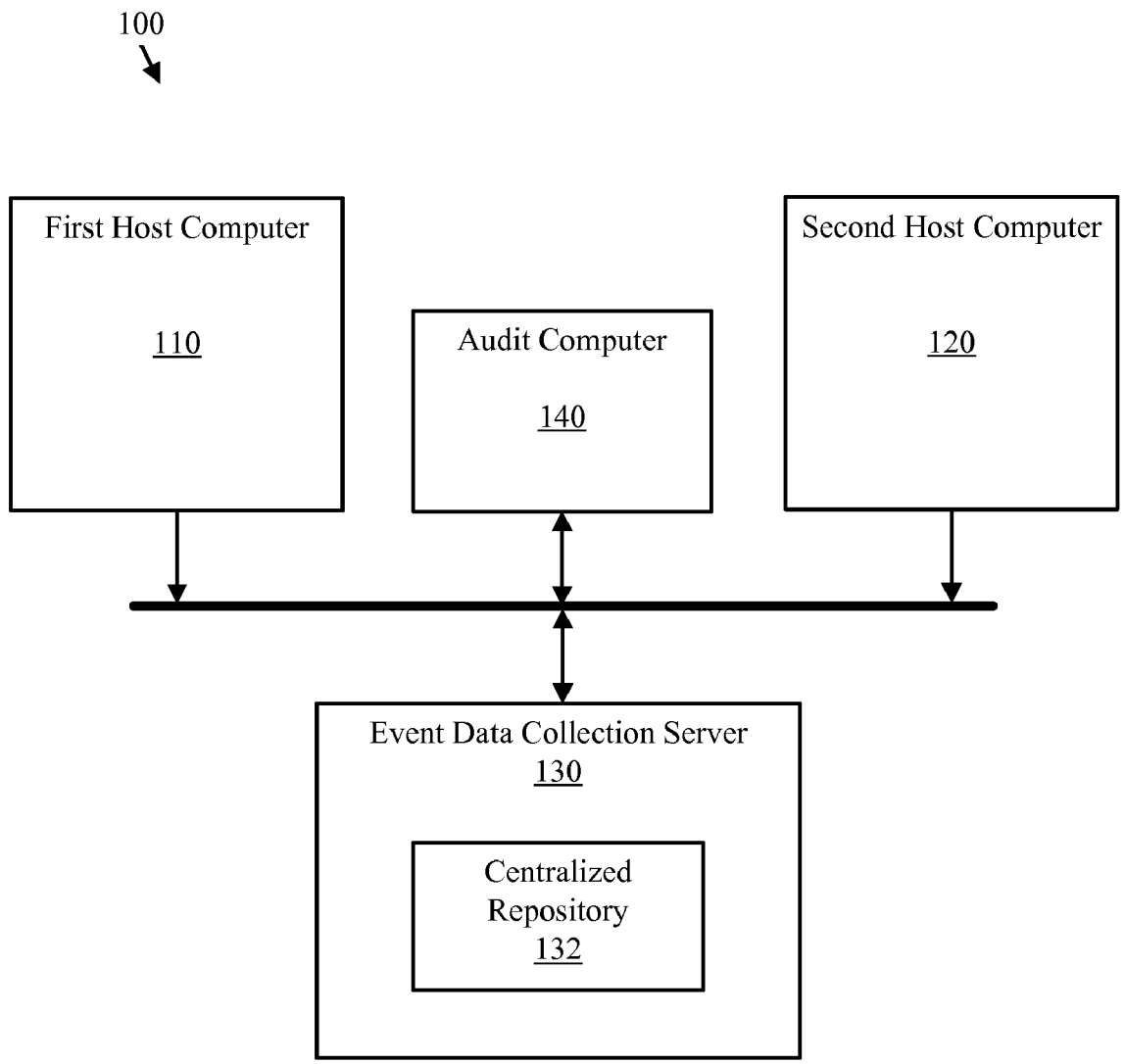
FIG. 1 is a block diagram illustrating one embodiment of a system to procure and audit digital rights management event data, according to various aspects of the present invention.

FIG. 1 is a block diagram illustrating one embodiment of a system 100 to procure and audit digital rights management (DRM) event data. The depicted system 100 includes a first host computer 110, a second host computer 120, an event data collection server 130, and an audit computer 140. The components of the system 100 operate to collect, standardize, centralize, and audit event data.

The first host computer 110 may collect event data in a first event data format and convert the event data from the first event data format to a standardized event data format. The first host 110 computer may communicate the event data to the event data collection server 130 for storage in the centralized repository 132. Similarly, the second host computer 120 may collect event data in a second event data format and convert the event data from the second event data format to the standardized event data format. The second host computer 120 may communicate the event data to the event data collection server 130 for storage in the centralized repository 132. In certain embodiments, the first and second host computers 110,120 each convert event data to a plurality of event data formats.

In certain embodiments, the first event data format and the second event data format each correspond to a first DRM technology operating on the first host computer and a second DRM technology operating on the second host computer. In certain embodiments, DRM technology may be embodied as a DRM module that collects event data in a format distinct from that of another DRM module. In such embodiments, the DRM module may not be the only source of event data. In certain embodiments, the system 100 may include additional host computers that perform operations similar to the first and second host computers 110,120 as described herein. In such embodiments, the additional host computers may include DRM technology distinct from the DRM technology of the first and second host computers 110,120.

The event data collection server 130 may authorize the audit computer 140 to access the first set of event data and the second set of event data. One of skill in the art will appreciate that authorizing access to event data may include a large variety of authorization operations. The audit computer 140 may perform an event data audit with respect to the first set of event data and the second set of event data.

An event data audit may include reviewing event data for normalcy, tracking device usage, deriving event statistics, investigating one or more events of interest and the like. In some embodiments, the audit computer 140 may initiate one or more queries against the centralized repository 132 to access event data of interest. In certain embodiments, the event data collection server 130 and the audit computer 140 are combined into a single computing platform.

In certain embodiments, the system 100 includes multiple audit computers, each capable of performing the operations attributed to the audit computer 140 as described herein. Additionally, in certain embodiments, each host computer may convert event data to a plurality of standardized formats that are each compatible with one or more auditing programs of the multiple auditing computers. Converting event data to multiple formats facilitates procuring event data that may be audited by audit computers with different format requirements.

Figure 2:
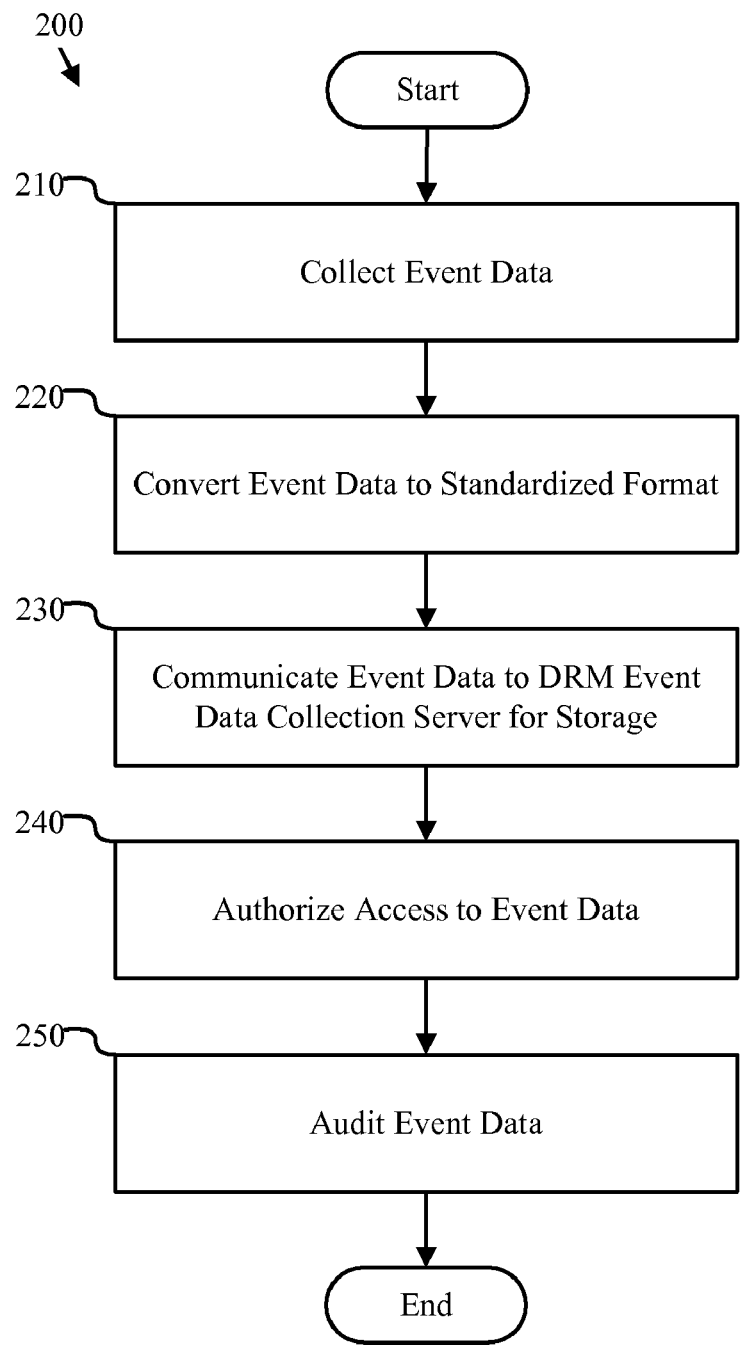
FIG. 2 is a schematic flow chart diagram illustrating one embodiment of a method to procure and audit digital rights management event data, according to various aspects of the present invention.

FIG. 2 is a schematic flow chart diagram illustrating one embodiment of a method 200 to procure and audit digital rights management (DRM) event data. The depicted method 200 includes the operations of collecting 210 event data, converting 220 the event data to a standardized format, communicating 230 the event data to an event data collection server for storage, authorizing 240 access to the event data, and auditing 250 the event data. In certain embodiments, operations 210-230 and 240-250 are implemented as separate and asynchronous processes. The operations of the method 200 depict a set of operations to collect, standardized, centralize, and audit event data.

Collecting 210 event data may include a first host computer collecting event data in a first event data format and a second host computer collecting data in a second event data format. In certain embodiments, the first event data format and the second event data format each correspond to a first DRM technology operating on the first host computer and a second DRM technology operating on the second host computer. Converting 220 event data to a standardized format may include converting the event data collected by a host computer to another event data format complementary to one or more auditing programs of an auditing computer. In certain embodiments, converting 220 may include converting event data from a format collected by a host computer to a plurality of standardized event data formats.

Communicating 230 event data to an event data collection server for storage may include a host computer communicating event data in a standardized format to an event data collection server. Authorizing 240 access to the event data may include an event data collection server authorizing an audit computer to access the event data for auditing. Auditing 240 event data may include an audit computer performing an event audit on the event data. In certain embodiments, auditing 240 may include an audit computer initiating a query against a centralized repository for event data of interest. As such, the present invention enables the collection, standardization, centralization and auditing of DRM event data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to procure and audit digital rights management (DRM) event data, the system comprising:
    a first host computer configured to collect a first set of event data in a first event data format;
    the first host computer further configured to convert the first set of event data from the first event data format to at least one standardized event data format and communicate the first set of event data to an event data collection server for storage; and
    a second host computer configured to collect a second set of event data in a second event data format;
    the second host computer further configured to convert the second set of event data from the second event data format to the at least one standardized event data format and communicate the second set of event data to the event data collection server for storage;
    the event data collection server configured to store the first set of event data and the second set of event data in a centralized repository;
    the event data collection server further configured to authorize access to the first set of event data and the second set of event data for at least one audit computer;
    the at least one audit computer configured perform an event data audit corresponding to the first set of event data and the second set of event data.

2. The system of claim 1, further comprising additional host computers, each host computer thereof configured to collect event data, convert the event data to the at least one standardized event data format, and communicate the event data to the event data collection server for storage.

3. The system of claim 1, wherein the at least one standardized event data format comprises a plurality of standardized event data formats.

4. The system of claim 3, wherein the at least one audit computer comprises multiple audit computers, each audit computer thereof corresponding to at least one of the plurality of standardized event data formats.

5. The system of claim 1, wherein the first event data format and the second event data format each correspond to a first DRM technology operating on the first host computer and a second DRM technology operating on the second host computer.

6. The system of claim 1, wherein the at least one standardized event data format corresponds to at least one event data audit program of the at least one audit computer.

7. The system of claim 1, wherein the at least one audit computer is further configured to initiate at least one query against the centralized repository for event data of interest.

8. The system of claim 1, wherein the event data collection server and the at least one audit computer are combined into a single computing platform.

* * * * *